United States Patent [19]

Lacotte et al.

[11] Patent Number: 4,888,266

[45] Date of Patent: Dec. 19, 1989

[54] PROCESS FOR PRODUCING INFORMATION SUPPORTS CAPABLE OF BEING OPTICALLY READ BY VARIATIONS IN ABSORPTION

[75] Inventors: Jean-Pierre Lacotte; Claude Puech, both of Paris, France

[73] Assignee: Thomson Brandt, Paris, France

[21] Appl. No.: 27,114

[22] Filed: Mar. 13, 1987

Related U.S. Application Data

[63] Continuation of Ser. No. 97,493, Nov. 26, 1979, abandoned, which is a continuation of Ser. No. 907,857, May 19, 1978, abandoned, which is a continuation of Ser. No. 683,245, May 4, 1976, abandoned.

[30] Foreign Application Priority Data

May 7, 1975 [FR] France ................................ 75 14331

[51] Int. Cl.⁴ ......................... G03C 5/18; G03C 5/34; G03C 5/00; G01D 5/26

[52] U.S. Cl. ..................................... 430/141; 346/1.1; 346/76 L; 346/135.1; 346/137; 369/272; 369/275; 369/283; 369/284; 369/285; 369/287; 369/288; 430/1; 430/5; 430/8; 430/11; 430/17; 430/23; 430/146; 430/147; 430/148; 430/269; 430/321; 430/332; 430/334; 430/367; 430/395; 430/396; 430/390; 430/393; 430/495; 430/945

[58] Field of Search ....................... 430/1, 5, 11, 8, 17, 430/23, 141, 146, 148, 332, 334, 367, 395, 396, 390, 393, 147, 269, 321, 495, 945; 358/4, 6, 7, 127, 128, 129, 130; 346/1.1, 76 L, 135.1, 137; 369/272, 275, 283, 284, 285, 287, 288

[56] References Cited

U.S. PATENT DOCUMENTS

| | | | |
|---|---|---|---|
| 1,760,780 | 5/1930 | Schmidt et al. | 430/172 |
| 3,381,086 | 4/1968 | Moss et al. | 178/7.1 |
| 3,665,483 | 5/1972 | Becker et al. | 346/76 L |
| 3,687,664 | 8/1972 | Broodbent | 96/35.1 |
| 3,836,369 | 9/1974 | Looney et al. | 96/49 |
| 3,842,197 | 10/1974 | Broussand et al. | 350/3.5 |
| 3,850,633 | 11/1974 | Moraw et al. | 96/27 H |
| 3,889,272 | 6/1975 | Lou et al. | 346/76 L |
| 3,894,179 | 7/1975 | Jacobs et al. | 96/36 |
| 3,902,010 | 8/1975 | Goshima | 178/6.7 A |
| 3,911,230 | 10/1975 | Neidell | 179/100.3 G |
| 3,913,076 | 10/1975 | Lehureau et al. | 340/173 LT |
| 3,943,302 | 3/1976 | Johnston | 179/10014 C |
| 4,335,198 | 6/1982 | Hanada et al. | 430/945 |

OTHER PUBLICATIONS

Kreiman, R. T., *Journal of the SMPTE,* vol. 83, #7, 7/1974, pp. 553–554.

Jerome et al., *Journal of the SMPTE,* vol. 83, #7, 7/1974, pp. 560–563.

Habib et al., SPSE Symposium on Unconventional Photographic Systems, 1964, pp. 113–119 and 126–133.

Kosar, J., "Light-Sensitive Systems", J. Wiley & Sons, 1965, pp. 267–268.

*Primary Examiner*—Charles L. Bowers, Jr.

*Attorney, Agent, or Firm*—Cushman, Darby & Cushman

[57] ABSTRACT

The invention relates to a process for producing supports intended for the optical recording and reading of information. A layer containing a diazo compound is deposited onto a metallized substrate. Recording is obtained by exposing the support to light through a mask, the exposed zones of the layer of diazo compound being decomposed. Dry development in ammonia vapors shows up transparent zones and opaque zones corresponding to the information.

7 Claims, 1 Drawing Sheet

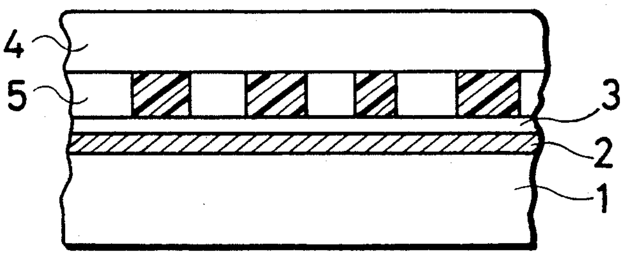
Fig. 1
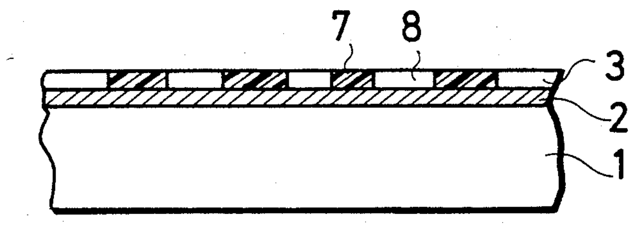
Fig. 2
Fig. 3
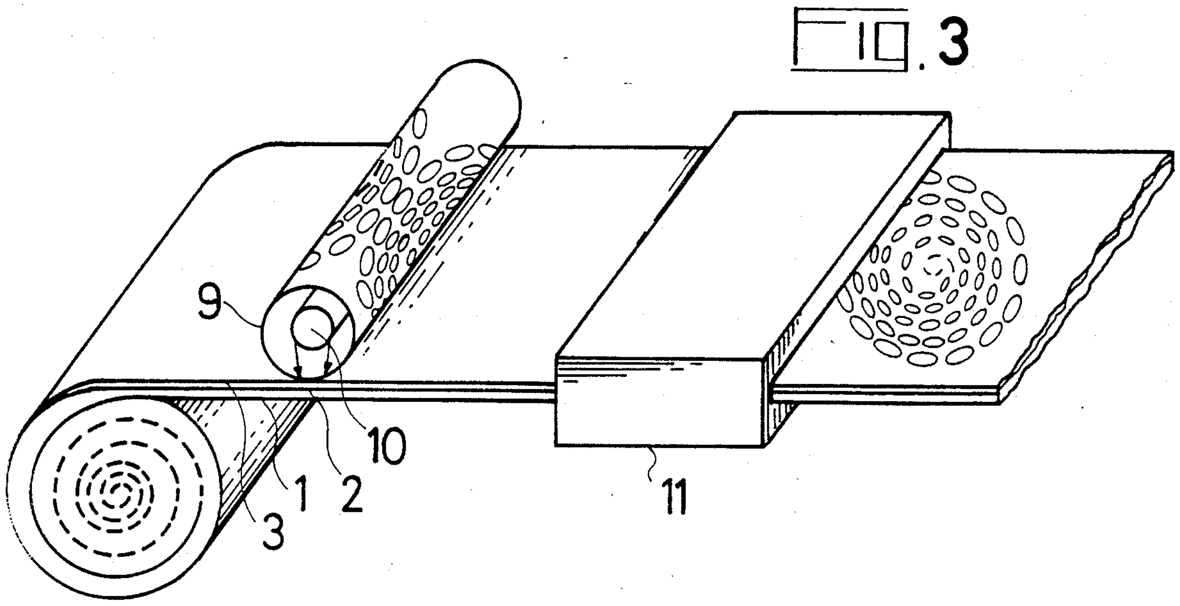

PROCESS FOR PRODUCING INFORMATION SUPPORTS CAPABLE OF BEING OPTICALLY READ BY VARIATIONS IN ABSORPTION

This is a continuation of application Serial No. 97,493, filed Nov. 26, 1979, abandoned, which was a continuation of S.N. 907,857 filed May 19, 1978, abandoned, which was a continuation of S.N. 683,245 filed May 4, 1976, abandoned.

This invention relates to a process for producing information supports capable of being optically read by variations in absorption.

It is known that information supports can be produced by depositing onto the surface of an optionally metallised substrate a photographic emulsion which is exposed to light for entering the information to be recorded. The emulsion thus exposed is then developed in a bath, development shows up zones which absorb reading rays to a greater or lesser extent. These processes are fairly slow. In addition, the photographic emulsions have grains of the order of 1000 Å in the case of high-resolution silver halide emulsions.

The present invention relates to a process for producing information supports which enables the production rate of these supports to be improved whilst at the same time providing for better characteristics, especially in regard to the grain sizes of the absorbing layer. Development is preferably carried out by a dry process which guarantees the dimensional stability of the recorded zones and the corresponding developed zones.

According to the present invention, there is provided a process for producing information supports capable of being optically read by variations in the absorption of reading rays in a layer in contact with a reflecting face, said process comprising a processing stage in which at least an organic diazo compound decomposable by photolysis into nitrogen and organic decomposition compound is deposited on one face of a substrate for forming a layer having a thickness of less than a few microns, a recording stage in which a mask is placed on said layer for determining visible and invisible zones, said visible zones of said layer being exposed to an actinic radiation, and a development stage in which a developing agent is placed in contact with said layer for achieving the development of said layer showing up zones absorbing said reading rays.

For a better understanding of the present invention and to show how the same may be carried into effect reference will be made to following description and the attached drawings among which:

FIG. 1 shows an information support according to the invention in the exposure phase of the process according to the invention.

FIG. 2 shows an information support after development.

FIG. 3 shows a recording and developing apparatus for carrying out the process according to the invention.

The process according to the invention utilises the photodegradation and coupling effects of organic diazo compounds (of which the molecule contains two nitrogen atoms) deposited onto a substrate, the film deposited onto the substrate being exposed to light in a first phase and then dry-developed in a second phase.

These effects are used for document reproduction, a layer of diazo compound between 5 and 10 μm thick being deposited onto a substrate and the motifs reproduced having dimensions of the order of 10 micron.

In the application of the process according to the invention for recording an angularly modulated carrier wave on a support in the form of zones which are transparent and opaque, respectively, to reading rays, the dimensions of the zones to be recorded are of the order of a micrometer. Accordingly, the layer of material in which the motifs are recorded has to be very fine: the smaller the dimensions of the zones to be recorded in a layer, the finer that layer has to be. However, the thickness of the layer is also governed by the required absorption of the reading rays passing through an opaque zone. Thus, if $I_o$ is the incident light intensity, $I_T$ the transmitted intensity, $\alpha$ a constant and z the thickness of the absorbing layer, then:

$$I_T = I_o e^{-\alpha z}$$

It is desirable to obtain maximum absorption with minimum thickness taking into account the size of the zones.

The substrate onto which the layer of diazo compound is deposited is thus a reflecting substrate so that the length of the path followed by the rays in the layer carrying the information is doubled by comparison with a support readable by transmission, the thickness of the layer required for a given absorption being divided by the factor 2.

As shown in FIG. 1, the information support consists of a plastic substrate 1, for example of polyvinyl chloride, covered by a layer 2 metallised by a conventional process, for example continuous metallisation by vacuum evaporation. The metallic layer obtained must be of good quality, i.e. homogeneous without any holes, and should have a reflection coefficient substantially equal to 1. This technique has been perfected and a few meters of metallised substrate per second is now obtained. The metallised plastic substrate is then coated with a layer or organic diazo compound which is either sprayed onto the metallised surface or applied by roll-coating this layer having a thickness of less than a few microns.

The metallised support comprising this layer of diazo compound may be supplied either in roll form or cut to size.

These diazo compounds have several properties of particular interest within the scope of the invention:

First of all, they have a very small grain of the order of 15 Å. For recording a motif 0.8 μm wide, this width being commonly used for recording a video frequency signal angularly modulating a rectangular carrier, the grain size of a high-resolution silver halide emulsion is of the order of ⅛th of the width of the track, whereas in the case of the diazo compounds it is only of the order of 1/500th of this same width.

In addition, the gradient of the curve characterising the blackening of the developed layer as a function of the light energy received by that layer is high. By virtue of this threshold effect, it is possible to minimize the effects caused by diffraction at the limits of the opaque and transparent zones during reading. Accordingly, these transition zones have small dimensions by comparison with the dimensions of the zones recorded.

The process for producing supports readable by variations in the absorption of reading rays is based on two types of reaction:

on the one hand, photolysis reactions of the diazo compounds, the action of rays of adapted wavelength (ultraviolet radiation) resulting in dissociation of the molecule of the diazo compound (or in certain cases in isomerisation) with formation of nitrogen;

on the other hand, coupling reactions of these diazo compounds with aromatic compounds giving dyes in which the two aromatic nuclei are connected through the group —N=N—.

These aromatic compounds may be either one of the decomposition products obtained after photolysis, which recombines with the diazo compound remaining, or a coupling compound mixed with the diazo compound when the layer is spread over the metallised substrate, the mixture being stabilised in such a way that the coupling reaction only takes place after exposure to light. The first method results in the formation of opaque zones corresponding to the zones exposed to light (negative process), whereas the second method results in the formation of opaque zones corresponding to the non-exposed zones (positive process).

Referring to FIG. 1, in order to record information, a mask consisting of a transparent substrate 4 and a layer 5, with zones that are transparent and opaque is applied to the layer of diazo compound 3. A source of actinic radiation acts through the transparent zones of the mask on the underlying diazo compound and decomposes it. The exposure energy required to obtain decomposition is of the order of $10^6$ to $10^7$ ergs/cm$^2$.

By way of example, and in the case of a positive process, the organic diazo compound may be:

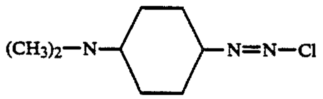

The photolysis reaction takes place in accordance with the following scheme:

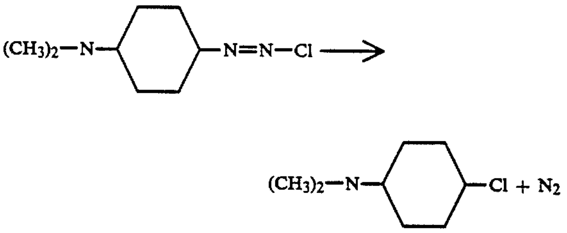

The organic decomposition product thus obtained is no longer capable of acting in a coupling reaction.

In the case of a negative process, the organic diazo compound used may be:

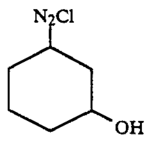

the corresponding photolysis reaction taking place in accordance with the following scheme:

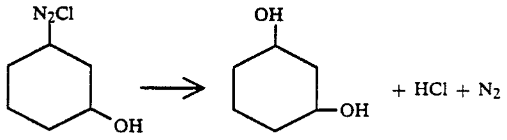

The layer of diazo compound is then dry-developed in ammonia vapour (in the presence of steam) so that opaque zones, such as 7 in FIG. 2, and transparent zones, such as 8, appear in this layers. The various layers of the support are denoted by the same references as in FIG. 1.

In the case of a "positive" process the diazo compound is mixed with a coupler, this mixture being stabilised if necessary by the addition of an adequate chemical substance removed by the ammonia vapours during development.

Reverting to the diazo compound mentioned by way of example above in reference to a positive process, the coupling compound may be:

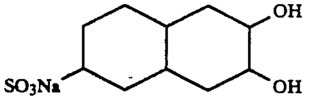

The corresponding coupling reaction is as follows:

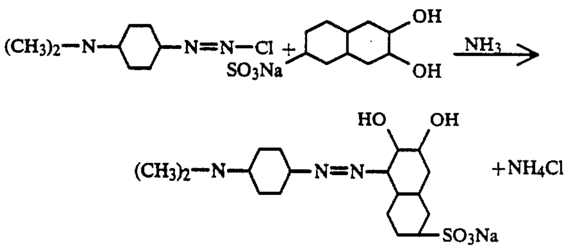

The compound obtained is a dye capable of absorbing reading rays of adapted wavelength. The coupling reaction, which lasts 60 seconds at 20° C., may be accelerated by increasing the temperature. Thus, it only lasts 10 seconds at a temperature of 60° C.

In the case of a negative process corresponding to the above-mentioned diazo compound

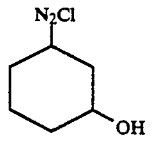

the exposure time being such that half the diazo compound is decomposed, the coupling reaction between the diazo compound and the organic decomposition product gives a dye.

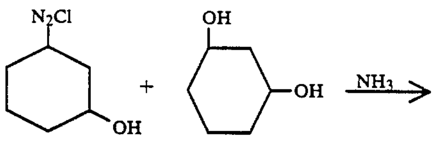

-continued

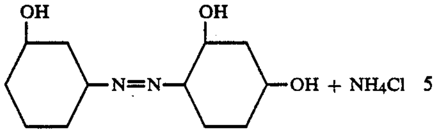

FIG. 3 illustrates a recording and developing apparatus for producing a series of discs bearing the same motifs from a roll of support which has been metallised and covered with a layer containing a diazo compound.

A support supplied in roll form comprising a substrate 1, a metallised layer 2 and a layer 3 containing a diazo compound and, optionally, a coupling compound is unrolled at a constant speed. A transparent cylinder 9 rotates without friction on this layer when the support is unrolled. The transparent cylinder carries a flexible mask forming the matrix of the information to be recorded. A monochromatic ultraviolet lamp 10 is arranged inside this cylinder parallel to its axis and emits ultraviolet light towards the layer 3. The photolysis reaction takes place in those zones of the layer 3 which are not covered by the mask.

The support then travels through a chamber 11 containing ammonia vapours. A coupling reaction then takes place in the zones which have been exposed to light in the case of a negative process or in the non-exposed zones in the case of a positive process, a dye capable of absorbing adapted reading rays being formed. The information-carrying layer thus formed is relatively strong. However, this layer is best protected in the case of a support obtained in a variant of the process described above.

In this variant the layer containing the photodegradable substance is deposited onto a non-metallised substrate; the recording of information and the development of this layer are carried out by one of the previously described means. The substrate thus carrying information is then metallised. Reading takes place through the substrate, which is then transparent, and the layer of diazo compound, the metallised layer reflecting the reading rays which have not already been absorbed and the zones opaque to these rays accentuating this absorption after reflexion.

The information support may also be in tape form. To this end, the recording and developing apparatus described above is modified to the extent that the flexible mask is in the form of tape, rotation of the cylinder in contact with the layer of diazo compound simultaneously unrolls the mask and the support.

The invention is not limited to the process or to the supports described above. In particular, development, which is preferably carried out by the dry method in order to prevent deformation of the motifs obtained after photolysis, may also be carried out by a wet process;

In addition, any substances capable of being decomposed by photolysis to form a substrate capable of abosrbing reading rays, provided they are deposited in thin layers onto a reflecting substrate, may be used for the purposes of the invention. This is particularly the case with substances in which the variation in absorption of reading rays is obtained by transfer of the CIS-trans-bond in the substance by means of monochromatic light.

It is also possible to use other substances, for example an inactive diazosulphonate which, after exposure to ultraviolet light, assumes an active form and may act in a coupling reaction.

What we claim is:

1. A process for producing an optically readable information support comprising the steps of:

providing a substrate;

providing on the first surface of the substrate an organic diazo compound layer having molecules decomposable by photolysis into nitrogen and a decomposition product, the layer having a thickness of less than a few micrometers;

providing a mask in contact with the diazo layer, the mask having opaque and transparent regions defining a video frequency signal angularly modulating a rectangular carrier, the transparent regions being on the order of one micrometer in width, exposing portions of the diazo layer to light through the transparent regions of the mask, to dissociate molecules of the exposed portions, thereby creating regions of dissociated and non-dissociated molecules corresponding to the transparent and opaque regions of the mask, respectively, the exposing time being such that in the exposed zones about half of the organic diazo compound remains and the other half is decomposed by photolysis;

developing the diazo layer by placing a developing agent in contact with the diazo layer, the developing agent facilitating the combination of decomposed molecules of diazo compound with the diazo compound remaining in the exposed zones after the step of exposing to form a dye in the exposed zones; and as a final step, metalizing the free surface for the diazo layer.

2. A process for producing an optically readable information support comprising the steps of:

providing a substrate;

providing on the first surface of the substrate an organic diazo compound layer including an organic diazo compound, a coupling compound and a stabilizing compound for preventing the coupling of the organic diazo compound with the coupling compound, the organic diazo compound being decomposable by photolysis into nitrogen and a decomposition product, the layer having a thickness of less than a few micrometers;

providing a mask in contact with the diazo layer, the mask having opaque and transparent regions defining a video frequency signal angularly modulating a rectangular carrier, the transparent regions being on the order of one micrometer in width, exposing portions of the diazo layer to actinic radiation through the transparent regions of the mask, to dissociate the molecules of the exposed portions, thereby creating regions of dissociated and non-dissociated molecules corresponding to the transparent and opaque regions of the mask, respectively, the exposing time being such that in the exposed zones substantially all of the organic diazo compound is decomposed by photolysis;

developing the diazo layer by placing a developing agent in contact with the diazo layer, the developing agent acting on the stabilizing compound so as to permit a coupling reaction to take place between the organic diazo compound and the coupling compound step of exposing to form a dye in the non-exposed zones; and as a final step, metalizing the free surface of the diazo layer.

3. A process for producing a replicate record from a master record comprising the steps of:

contacting said master record, comprising a record of information in the form of a record of a distribution of radiation transmissive apertures, at least some of which apertures therein have a cross sectional dimension of about 1 μm in size, with said replicate record comprising a light permeable substrate carrying a layer of a photosensitive material undergoing decomposition by photolysis, exposing said replicate record through said master record with radiation that is actinic to said photosensitive material, developing said replicate record to duplicate the information in the master record onto the replicate record in the form of a pattern providing variation in absorption of reading rays, and finally, and subsequent to said developing step, overlaying said layer with metallization thereby allowing reflective readout of said replicate record through said substrate.

4. A process as claimed in claim 3, wherein said master record is a flexible element.

5. A process as claimed in claim 3, wherein said developing selectively provides a dye in the exposed portions of said layer.

6. A process as claimed in claim 3, wherein said developing selectively provides a dye in the non-exposed portions of said layer.

7. A process as claimed in any of claims 3 to 6, wherein said photosensitive material is a diazotype material having a photosensitive diazo compound and dye coupler.

* * * * *